INVENTORS
M. G. Nicholson, Jr., deceased
by Katherine C. Nicholson, Executrix
R. A. Smith
BY F. J. Sullivan
ATTORNEY

DATA TRANSMISSION SYSTEMS

Filed Sept. 24, 1959 5 Sheets-Sheet 2

INVENTORS
M. G. Nicholson, Jr., deceased
by Katherine C. Nicholson, Executrix
R. A. Smith BY F. J. Sullivan
ATTORNEY

DATA TRANSMISSION SYSTEMS

Filed Sept. 24, 1959 5 Sheets-Sheet 3

INVENTORS
M. G. Nicholson, Jr., deceased
by Katherine C. Nicholson, Executrix
R. A. Smith BY F. J. Sullivan
ATTORNEY June 11, 1963 M. G. NICHOLSON, JR., ET AL 3,093,707
DATA TRANSMISSION SYSTEMS
Filed Sept. 24, 1959 5 Sheets-Sheet 4

INVENTORS
M. G. Nicholson, Jr., deceased
by Katherine C. Nicholson, Executrix
R. A. Smith
By F. J. Sullivan
ATTORNEY

DATA TRANSMISSION SYSTEMS

Filed Sept. 24, 1959 5 Sheets-Sheet 5

INVENTORS
M. G. Nicholson, Jr., deceased
by Katherine C. Nicholson, Executrix
R. A. Smith BY F. D. Sullivan
ATTORNEY United States Patent Office 3,093,707 Patented June 11, 1963

3,093,707

DATA TRANSMISSION SYSTEMS

Madison G. Nicholson, Jr., deceased, late of Snyder, N.Y., by Katherine C. Nicholson, executrix, Snyder, N.Y., and Robert A. Smith, Eggertsville, N.Y., assignors to Sylvania Electric Products Inc., a corporation of Delaware Filed Sept. 24, 1959, Ser. No. 842,549
15 Claims. (Cl. 178—23)

This invention is concerned with electronic data processing and communication systems, and particularly with the correction of transmission errors in such systems.

In pulse coded or digital communication and data processing systems having either radio or closed circuit linkage, intelligence is transmitted or processed in the form of electric or electromagnetic impulses. For example, in binary coded communication systems, messages may be comprised by the presence or absence, or by variations in the amplitude, of synchronous signals representing the ones and zeros of a binary code. The reliability of these digital systems is affected by the extent to which noise and other interference distort the impulse signals during transmission so that ones are mistaken for zeros and vice versa or to which phenomena such as momentary fading of radio frequency carriers at times delete digits or groups of digits from the attempted communication.

Copending U.S. patent application of S. A. Fierston and P. Marino (Ser. No. 727,103, filed April 8, 1958) may be consulted for an analysis of the present state of the art in coping with errors of the type under discussion. As explained in this referenced patent application, several different approaches involving complicated mathematical analyses have been employed to check whether the digits of the received message correspond with those transmitted.

These present state of the art techniques share the merit of indicating when erroneous digits may have been received, but are limited to the vagaries and time delay of repetitive re-transmissions in order to correct them, and those equipments which do attempt error correction are relatively expensive and complicated.

Accordingly, a primary object of the present invention is to provide a more practical and simplified system for the correction of errors in communication and data processing systems without requiring re-transmission of the erroneous text. Other objects are to provide means for supplying missing digits in a received message, and improved transmission techniques for data processing and communication systems.

These and related objects are accomplished in one communication system utilizing the invention by converting each character of the message, before transmission, into a sequence of binary digits comprising a code word having characteristics (to be explained below) which make it possible to reconstruct the communicated message at the receiver even though a number of digits in the code word have been erroneously received or lost in transmission. In the illustrative system to be described, the individual binary MARK and SPACE component characters of a teletypewriter message are encoded by the process of loading them into a multi-stage shifting register which has appropriate control connections to perform modulo-two addition upon the contents of selected stages and to process the resulting sum digits sequentially through the register to produce a word $2^n-1$ digits long (where $n$ is the number of digits initially loaded into the shifting register). This word is then employed to modulate the transmitter.

At the receiver, the word detected from the carrier is processed through a decoder which performs a series of comparisons to verify, and correct if necessary, the component digits of the received word which is thereupon reconverted to the original teletypewriter character encoded at the transmitter.

Other objects, embodiments and modifications of the invention will be apparent from the following more detailed description of this illustrative communication system which will be explained with reference to the accompanying drawings, wherein.

Figure 1:
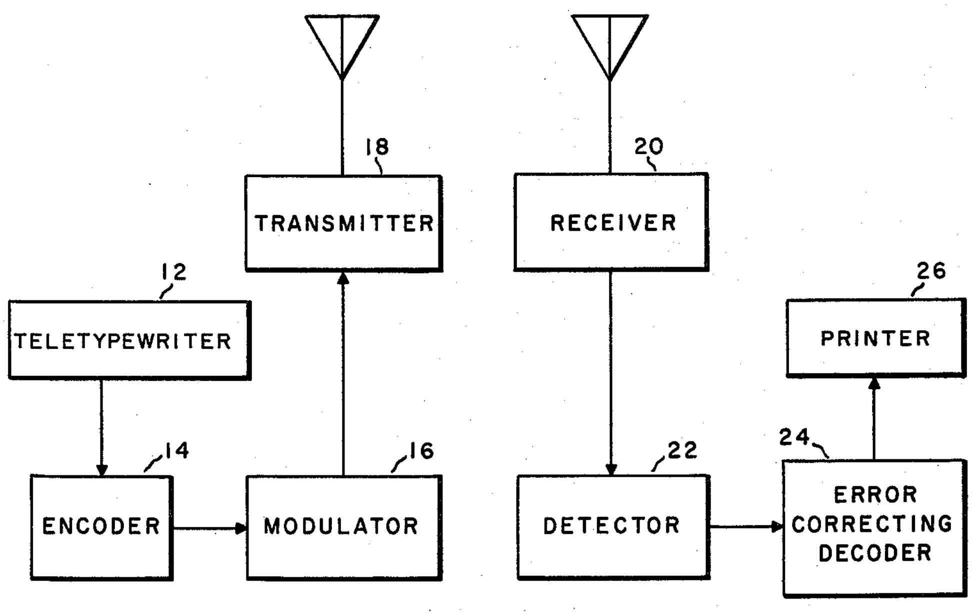
FIG. 1 is a functional block diagram of a radio teletypewriter system embodying the invention.
Figure 3:
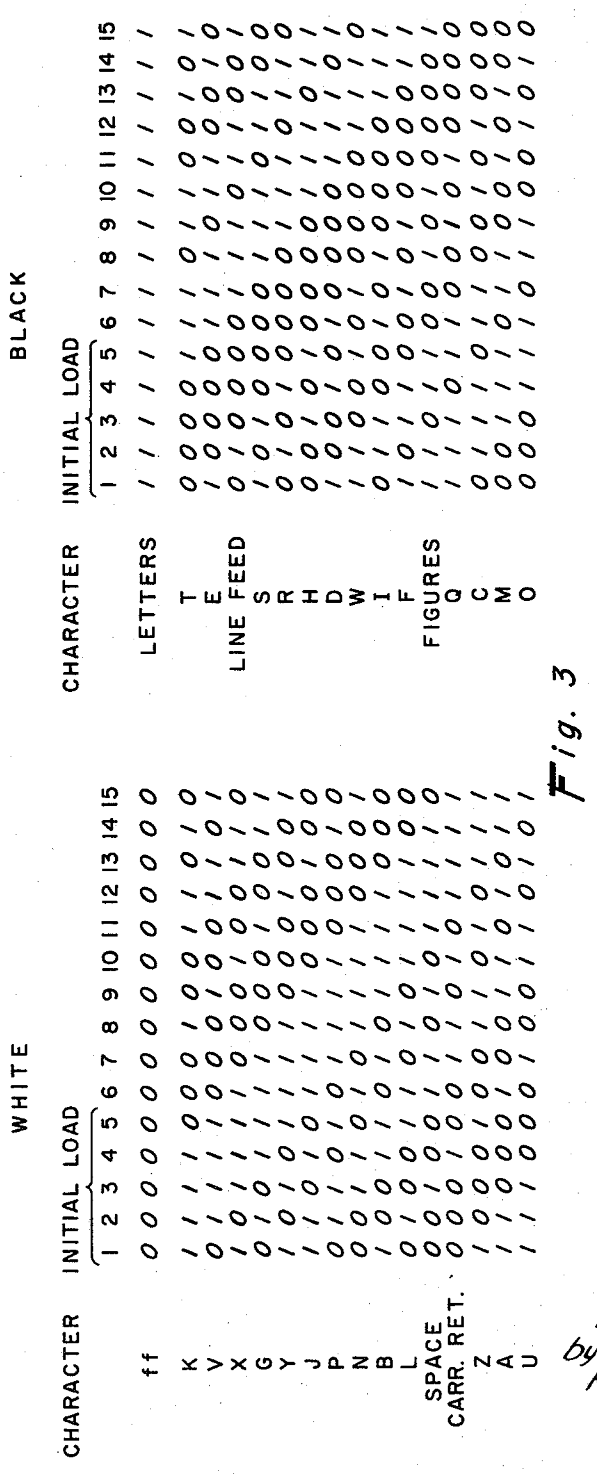
FIG. 3 is a tabular representation of a code produced by the encoder of the other figures.
Figure 4A:
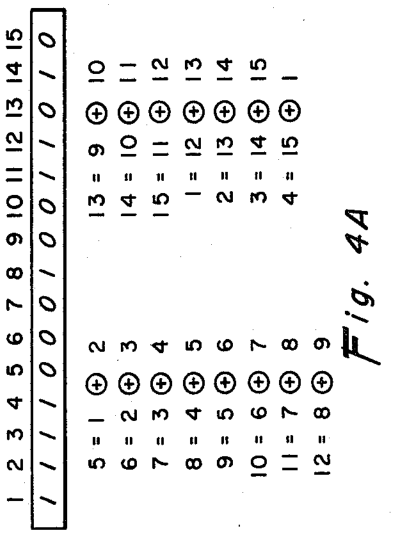
Figure 4B:
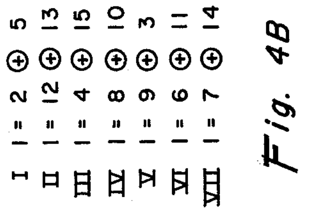
Figure 5:
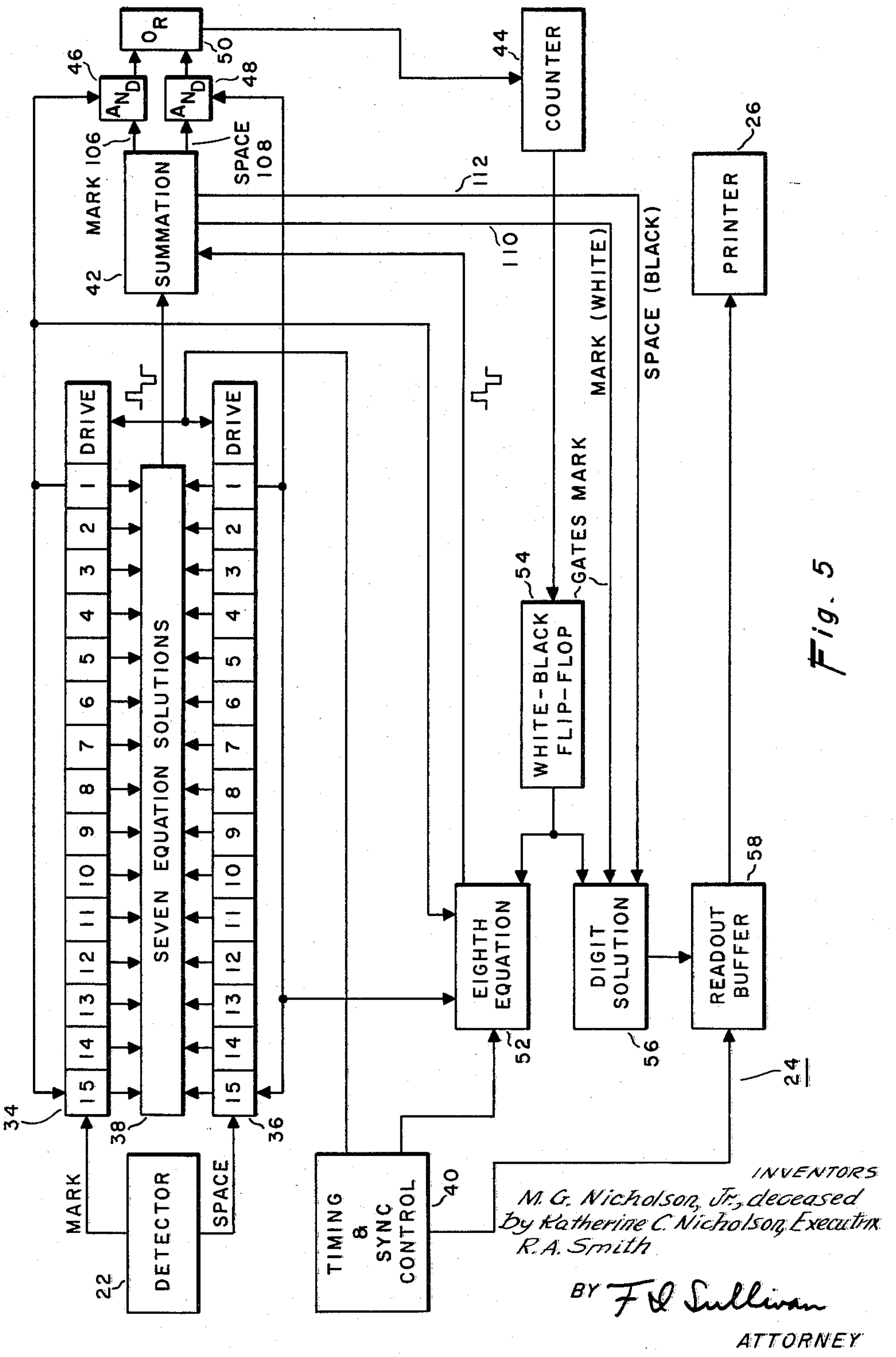
Figure 7:
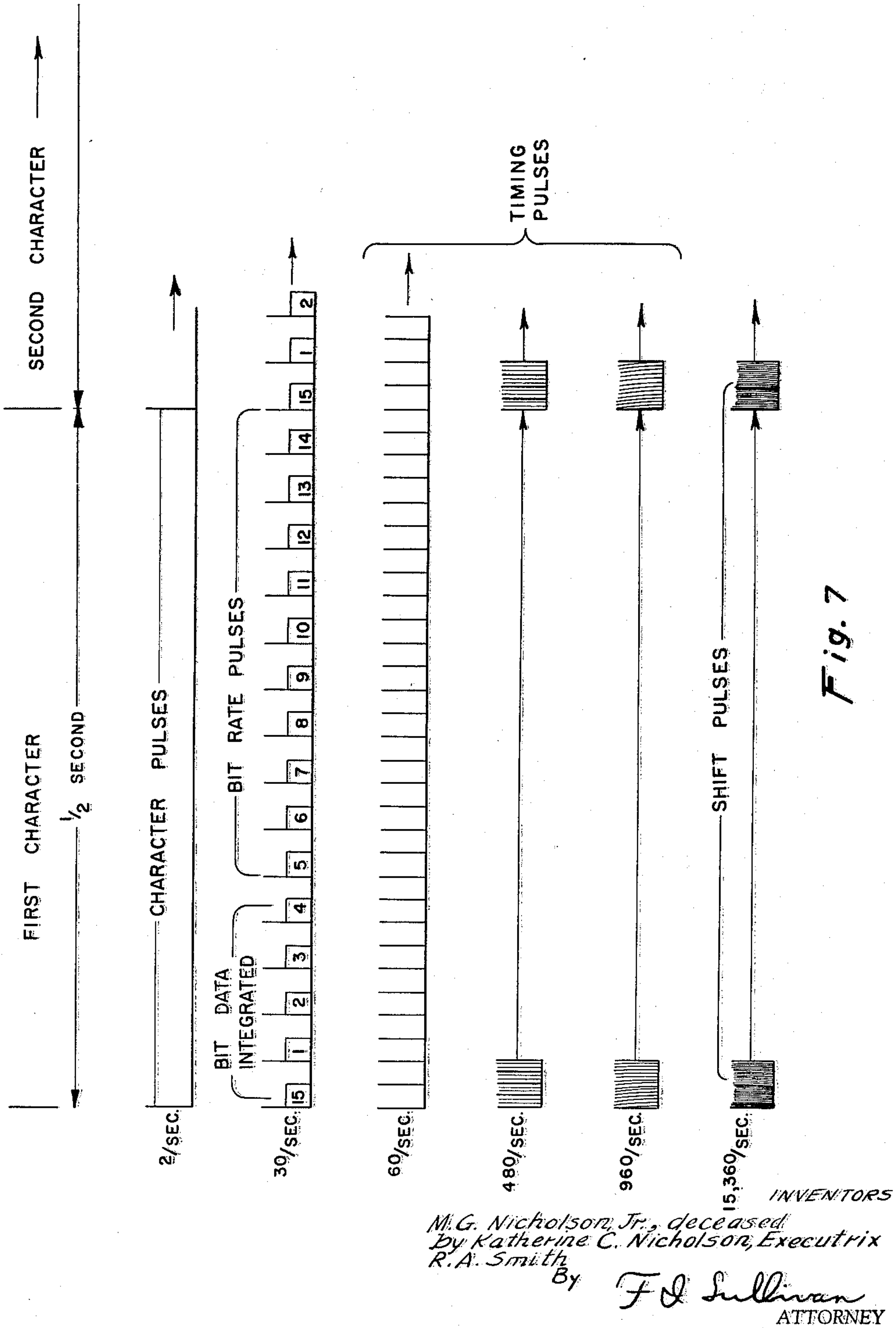
Figure 6:
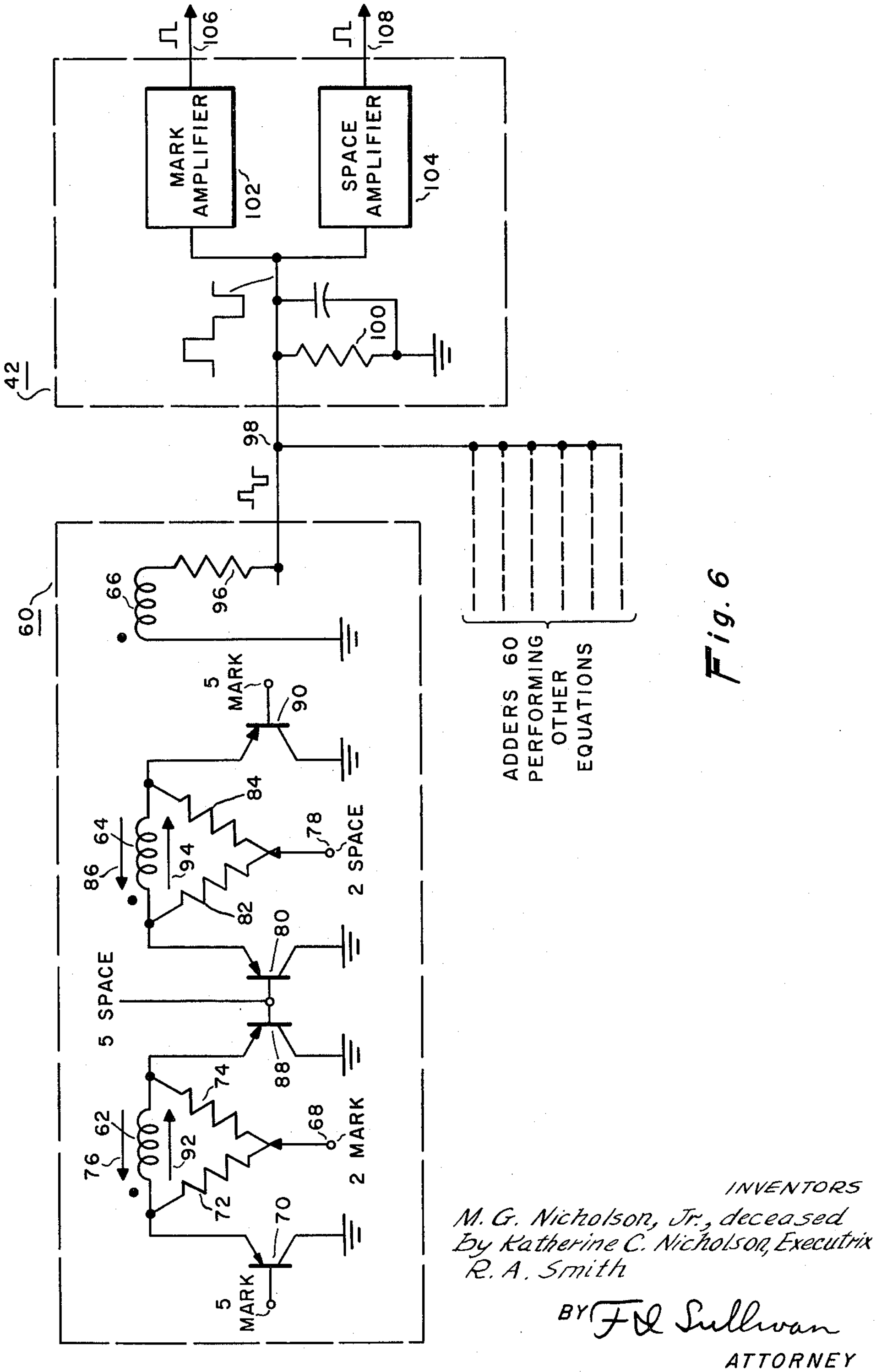

FIG. 4*a* is a tabular analysis of the mathematical relationship of the binary digits comprising the character K in the code of FIG. 3;

FIG. 4*b* is a series of equations derived from the data of FIG. 4*a*;

FIG. 5 is a functional block diagram of the receiving station of the system of FIG. 1;

FIG. 6 is a schematic diagram of a representative circuit employed to perform the requisite mathematical and logical operations involved in the decoding process; and FIG. 7 is a diagrammatic representation of the timing and control pulses of the system of FIG. 5.

The radio teletypewriter communication system shown in FIG. 1 comprises: a teletypewriter 12; an encoder 14; a modulator 16; a radio transmitter 18; a receiver 20 for energy broadcast from the transmitter 18; a detector 22; an error correcting decoder 24; and, a printer 26. The encoder 14 and decoder 24 embody error correcting features of the present invention. Hence, their structure and operation will be explained in detail. The other components of the system are well known in various modifications to those skilled in the art of radio communication and electronic data processing. Consequently, there is no need here for a detailed explanation of them or of the overall operation of the system.

*Encoder*

Figure 2:
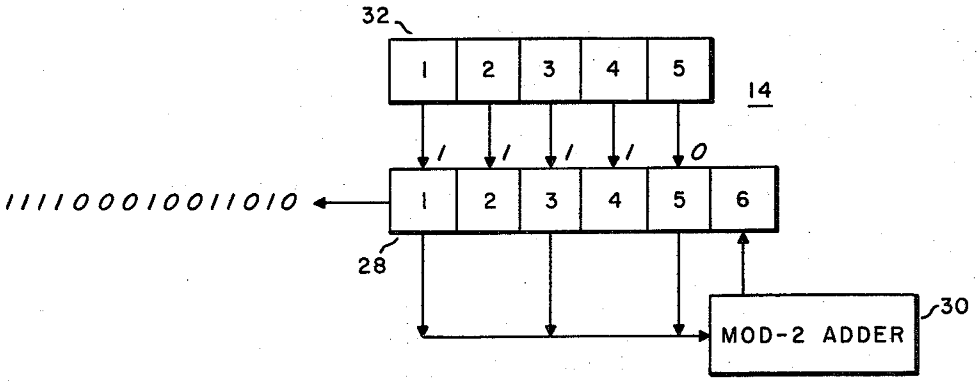
FIG. 2 is a block diagram of a portion of the encoder of the system of FIG. 1.

The encoder 14, which is shown in FIG. 2, performs the basic function of converting each five binary bits combination of MARKS and SPACES (whereby the teletypewriter 12 indicates a character of the standard radio teletypewriter alpha-numeric code) into a fifteen bit digitally encoded word which is employed to modulate the transmitted radio frequency carrier.

The principal component of the encoder 14, as shown in FIG. 2, is a shifting register 28. This register is represented as having six stages with feed-back connections from the first, third and fifth stages through a mod-two adder 30 to the sixth. Thus, if we assume that an initial load such as 11110 represented as passing from the teletypewriter through a buffer storage 32 (e.g. a magnetic tape) is inserted into the register 28, and the register is then shifted fifteen times in the direction of the arrow, the fifteen digit sequence shown will be shifted out of the first stage as a result of the mod-two addition of stages 1, 3 and 5, being processed into stage 6 and thence through the register 28.

The code of FIG. 3 shows the various fifteen bit sequences resulting from performing this shifting and adding operation with the inter-stage connections shown in FIG. 2 for each of the thirty-two possible initial five stage loads corresponding to the thirty-two characters of the standard Baudot teletypewriter code. It should be noted that the entire thirty-two groupings involve only four different fifteen bit sequences of digits, viz. the fifteen zeros representing *ff*, the fifteen ones representing letters, the various shifted versions of the same sequence of eight ones and seven zeros representing WHITE words, and the fifteen corresponding complementary shifted versions of seven ones and eight zeros representing BLACK words.

Close study and anlysis of FIG. 3 reveals that the WHITE words K-U may be produced by: initially loading a four stage shifting register with four ones; shifting the register fifteen times ($2^n-1$, where $n$ is the number of stages in the register, viz. 4); deriving the fifteen successive digits of the word as each digit is shifted out of the first stage; and, loading the final stage with a feed-back mod-two addition from the first and second stage as each shift takes place.

Similarly, the BLACK words may be produced by: initially loading a four stage shifting register with four zeros; shifting the register a similar number of times (15) to derive the output digits; and, loading the fourth stage with a feed-back mod-two subtraction, i.e. a complementary addition, of the contents of the first two stages after each shift.

Thus, all thirty-two characters of the code of FIG. 3 can be generated from two basic shift register generators, given the proper initial load and feed-back connections. Moreover, both the WHITE and the BLACK words can be generated in a single shift register with only mod-two feed-back connections (instead of requiring both mod-two and complementary mod-two operations) if a five stage configuration with feed-back connection through a mod-two adder from the first, third and fifth stages is employed. This is the modification illustrated in FIG. 2. If any one of the thirty-two initial loads indicated is inserted into the first five stages and the register is shifted fifteen times, the corresponding one of the thirty-two code words of FIG. 3 will be generated.

Further analysis reveals that those WHITE and BLACK words which involve combinations of ones and zeros are so-called "Perfect Words" of the maximum-length shift register sequence (m-sequence) variety discussed in the following references: D. A. Huffman, "The Synthesis of Linear Sequential Coding Networks," Proceedings of Third London Symposium on Information Theory, pp. 77–95, Academic Press, New York, 1956; S. W. Golumb, "Sequences with Randomness Properties," Terminal Progress Report, Contract No. 639,498, Glen L. Martin Co., Baltimore, Md., 1955; and, N. Zierler, "Linear Recursive Sequences I," Group Report 34–63, Lincoln Laboratories, M.I.T., Lexington, Mass., 1957.

The following four properties of m-sequence perfect words which are manifested by the code of FIG. 3 are useful for the encoding and decoding techniques of the present invention.

(1) Each fifteen bit binary word occurs once and only once in a complete cyclic permutation of the particular sequence of digits concerned. This may be noticed by the shift of the word one digit to the right to form each of the fifteen words in the sequences K through U and T through O respectively.

(2) When any of the sequences is compared digit for digit with any other, one more disagreement than agreement results. For example, digit by digit comparison of any two WHITE words, or any two BLACK words (except for the case of all zeros or all ones) results in seven similarities and eight dissimilarities.

(3) When any one of the sequences of one word is compared, digit for digit, with any one of the sequences of its complementary word, the situation is reversed and there are eight similarities and seven dissimilarities in all phases, except where the two sequences align as a complementing function, e.g. K and T, V and E, etc. Here, every one of the fifteen digit comparisons is a dissimilarity.

(4) Within each word, each bit has a definite mathematical relationship to all the remaining bits. This is demonstrated by the tabular analysis of FIG. 4a for the particular word representing the character K. In the data presented the symbol $\oplus$ represents sum-modulo-two addition, i.e. add without carry. The same relationship exists for each of the cyclic permutations of both the WHITE and the BLACK words.

The first three of these characteristics, when properly utilized in the manner of the present invention, make it possible to correct as many as three transmission errors and supply as many as six (sometimes seven) missing digit, by providing the code of FIG. 3 wherein every character-representing word of the thirty-two word group is separated from every other word by at least seven digits. This may be demonstrated in the following manner.

First, if any pair of sequences is selected, both from the WHITE group (or from the BLACK group), direct examination shows that there exist seven positions in which the two selected sequences agree digit for digit and eight positions in which they disagree. Second, if a fixed but arbitrary word of the WHITE group is compared with each word of the BLACK group, except for its 1–0 complement, there are eight positions in which the compared words agree and seven positions in which they disagree. On the other hand, if this selected word is compared with its 1–0 complement, it disagrees in all fifteen positions. Third, the sequence of all ones agrees in eight positions and disagrees in seven positions with the members of the WHITE word group, whereas it agrees in seven positions and disagrees in eight positions with the members of the BLACK word group. Fourth, the sequence of all zeros agrees in seven positions and disagrees in eight positions with the members of the WHITE word group and agrees in eight positions and disagrees in seven positions with the words of the BLACK word group. Fifth, the sequence of all ones disagrees in fifteen positions with the sequence of all zeros.

Thus, if any one of the words in the thirty-two word group has been modified by three errors, three changes can be made to restore it to its error-free form because at least four changes would be required to convert it to one of the other words in the code group. Consequently, if up to three digits are lost or garbled during transmission, this fact can be detected and the transmitted word may be recreated or accurately decoded. The manner in which this is accomplished will be described subsequently as part of the operation of the decoder 24.

The fourth "perfect word" characteristic of the code system of FIG. 3 enumerated above, viz. that each bit in the word has a definite mathematical relationship to all of the remaining bits, makes it possible to verify the first digit of the word by solving for it in the seven equations of FIG. 4b which involve each of the remaining digits of the word. These equations have been derived as follows.

Referring to the tabular analysis of FIG. 4a, and the manner in which these fifteen digit words may be generated from a four stage shift register by inserting mod-two addition of the first and second stages into the fourth stage as each digit of the word is shifted from the first stage, it may be noted that $5=1\oplus 2$, $1=12\oplus 13$, and $4=15\oplus 1$. Since any binary number added to itself equals 0, these relationships may be expressed in the following equations:

(I) $1=2\oplus 5$ (II) $1=12\oplus 13$ (III) $1=4\oplus 15$

Substituting in Equation II we find, $$1=12\oplus 13=8\oplus 9\oplus 10$$

Therefore, (IV) $1=8\oplus 10$

In FIG. 4*a* we find 9=5⊕6 and 6=2⊕3. Therefore, 9=5⊕2⊕3. But 5⊕2=1 (Equation I). Consequently, 9=1⊕3 and (V) 1=9⊕3

Again, according to FIG. 4*a*, 10=6⊕7 and 11=7⊕8. Thus, 10⊕11=6⊕7⊕7⊕8=6⊕8 and therefore

10⊕11=6⊕8 or

8⊕10=6⊕11

But since 8⊕10=1 (Equation IV), (VI) 1=6⊕11

Finally, FIG. 4*a* demonstrates that

7=3⊕4=14⊕15⊕15⊕1=14⊕1

Therefore, (VII) 1=7⊕14

A review of these seven equations demonstrates that they relate each of the remaining fourteen digits in the fifteen digit word to the first digit once, and only once, in the full cycle of seven comparisons, i.e. equation solutions, involved. Thus, they provide a means for verifying the message digits received by the decoding equipment which will now be described.

*Decoder*

The decoder 24 which processes each incoming word to discover and correct errors is diagramed in FIG. 5. Its principal components are: a MARK storage register 34 and a SPACE storage register 36 both of which may be conventional flip-flop or magnetic core devices with feedback connections from their final to their initial stages; an equation network 38 comprising seven "equation" circuits of the type shown schematically in FIG. 6; a timing and sync control circuit 40; a solution summation circuit 42 which is also shown schematically in FIG. 6; a counter 44 connected to the summation circuit via AND gates 46 and 48 and OR gate 50; an eighth equation circuit 52; a WHITE-BLACK flip-flop circuit or other bistable device 54; a digit solution circuit 56; and, a read-out buffer 58.

Timing and sync control 40 includes a system clock and suitable count down and gating circuits whose arrangement and operation will be discussed in more detail in the following description, particularly under the heading "Timing." The counter 44 may be any conventional three binary stage device arranged to transmit an output pulse to WHITE-BLACK flip-flop 54 when it has counted a series of eight input pulses received from OR gate 50. Typical counters are described in the publication "Pulse and Digital Circuits" by Millman and Taub (McGraw-Hill, 1956).

The eighth equation 52 is a circuit combination of flip-flops and gates arranged to connect the contents of the first stages of the MARK and SPACE registers 34 and 36 to the summation circuit 42 with the proper polarity, depending upon whether a WHITE or BLACK word is under process, to enter into the determination of its own computed identity with a weight of "one" in combination with the results of the solution of each of the seven digit solution equations which compute what this first digit should be.

The read-out buffer 58 may be any conventional system for receiving a standard five bit per character teletypewriter code, framing each character with standard start and stop pulses, and operating a printer. Its principal components are a standard 22 millisecond pulse generator, a six bit pulse shifting register (one stage for each of the five bits per character and one for a control bit) and a read-out flip-flop.

The digit solution circuit 56 includes a combination of flip-flop circuits and gates arranged to render this circuit inoperative during the determination of whether the word under process belongs to the WHITE or BLACK category and to connect either line 110 or 112 to the read-out buffer 58, in a manner which is later explained in more detail, during the digit read-out cycle.

The detector 22 may be any of the conventional devices used in radio or closed circuit teletypewriter systems for converting received energy into mark and space signals. A typical example is a standard frequency shift keying (FSK) converter.

These various components and sub-systems perform the error correcting function in the following manner.

The signals arriving at the receiver 20 are processed through the detector 22 where they are separated into MARK and SPACE sequences which are stored in the MARK and SPACE registers 34 and 36, respectively. The first task in the decoding operation is to determine whether the word which has been received belongs to the WHITE or BLACK category. This is accomplished by pulsing the shift registers 34 and 36 fifteen times while performing, after each one of the shifting operations, the seven equations previously referred to which involve each one of the digits in each stage of the register.

If the word under analysis belongs to the WHITE category and it contains no errors, the equations result in agreement with the first digit for each of the seven comparisons made in each of the fifteen shifted versions of the word. When, however, the word belongs to the BLACK category, a preponderance of the seven equation solutions indicate dissimilarity with the first digit for each comparison and an impulse is transmitted to the counter 44 to advance it one step. Thus, if no erroneous digits are received and the word is BLACK, the result will be a total count of fifteen after the registers 34 and 36 have been shifted fifteen times. This indication triggers the WHITE-BLACK flip-flop 54 to indicate that a BLACK word has been received. Conversely, if the fifteen digits of a WHITE word have been received without error, the result is a total of fifteen similarities as the equations are performed and the counter 44 is not advanced. Hence, the flip-flop 54 remains in its preset condition to indicate that a WHITE word has been received. As a practical matter, a preponderance of similarities or dissimilarities will determine the proper category of the word and a count of eight is sufficient to indicate that it is BLACK.

After the decoder has made the initial determination of whether the word being processed belongs in the WHITE or BLACK category, the registers 34 and 36, which have been brought full cycle back to their original condition after the fifteen shifts of these fifteen stage registers, are shifted an additional five times to verify each of the five digits originally encoded. During this interval the output of the equation summation circuit 42 is connected to the final digit solution circuit 56 instead of to the counter 44. Also, the output of the eighth equation solution circuit 52 is taken into consideration in the digit solution. As was explained during the description of the encoding portion of the equipment, these initial five digits are the Baudot code representation of a teletypewriter character. When they have been verified and corrected, they are processed through the read-out buffer 58 to the output printer 26.

A more detailed description of the structure and operation of the equation solution circuits follows.

As explained previously, the various combinations of digits which comprise the code used have "perfect word" characteristics. One of these is that the first digit of the WHITE words may be represented by sum-modulo-two addition of individual combinations of the fifteen digits in each word in accordance with the equations set forth in the schedule of FIG. 4*b*. FIG. 6 shows the subsystem which is employed to implement the solution of these equations. A single mod-two adder 60 is shown. This unit will solve one of the equations, and it is to be understood that a total of seven indentical units comprise the complete equation network 38.

For the purposes of explanation assume that the circuit of FIG. 6 is performing a solution of the equation $2 \oplus 5 = 1$. Or, in other words, that it is performing a sum-modulo-two addition of the second and fifth stages of the registers 34 and 36 to verify the indicated condition of the first stage.

Referring to FIG. 6, the modulo-two addition function required takes place in a transformer having two primary windings 62 and 64 and an output winding 66. A positive signal output from winding 66 indicates that the equation has determined that the first digit, i.e. the contents of the first stage, should be a MARK and a negative signal that it should be a SPACE. The circuit operates in the following manner.

If both the second and the fifth digits are MARKS, positive signals are applied to the terminal 68 and the base of transistor 70. This produces a current through resistors 72 and 74 and, in the direction of arrow 76 through winding 62. Similarly, if both digits are SPACES, positive signals are applied to terminal 78 and the base of transistor 80. This causes a flow of current through resistors 82 and 84 and parallel input winding 64 in the same direction (see arrow 86). If, however, one of the two stages contains a MARK signal and the other a SPACE, current flow is through transistor 88 or 90 and through the corresponding windings 62 or 64 in opposition to the previous direction as indicated by the arrows 92 and 94, respectively. This provides an output pulse of one polarity if the inputs are two MARKS or two SPACES and of the opposite polarity if they are one MARK and one SPACE, thereby performing the desired modulo-two addition.

The positive and negative going signals in the output winding 66 are connected through an isolation resistor 96 to the terminal 98 in the summation circuit 42 which comprises an RC network 100 connected to a MARK amplifier 102 and a SPACE amplifier 104. The seven mod-two adders 60 which solve the various equations are connected in common to the terminal 98 and RC network 100 provides a summation of the seven signal inputs. If the net sum is a positive going signal it is amplified by the MARK amplifier 102 and provides a positive signal input to the MARK bus 106. If the sum is a negative signal it is amplified by the SPACE amplifier 104 which provides a positive signal to the SPACE bus 108.

During the BLACK and WHITE solution cycle the MARK bus 106 and the contents of the first stage of the MARK register 34 provides two inputs to AND gate 46 and the SPACE bus 108, and the contents of the first stage of the SPACE register 36 provide similar inputs to AND gate 48. The outputs of these respective AND gates are connected to OR gate 50 which operates the counter 44. As has been explained, the function of this circuit is to detect whether the solution of the equations agrees or disagrees with the first digit of the word under process. Agreement is an indication of a WHITE word and disagreement, a BLACK word. Thus, if a MARK signal is transmitted over bus 106 and at the same time the content of the first stage in the MARK register 34 provides a MARK signal, this agreement indicates a WHITE word. Similarly, if a signal on the SPACE bus 108 coincides with a signal in the first stage of the SPACE register 36, again there is agreement and a WHITE word is indicated.

An output signal from either of the AND gates 46 or 48 can be utilized, via the OR gate 50, to actuate the counter 44 which will trigger the BLACK-WHITE flip-flop 54 as soon as a preponderance of eight (more than half of the fifteen summations of the seven equations) is achieved. In order to provide that the BLACK word indications instead of the WHITE shall be counted, the AND circuits 46 and 48 are connected with the OR gate 50 in an EXCLUSIVE OR configuration. Thus, an impulse will be transmitted to the counter 44 only when both MARK gate 46 and SPACE gate 48 indicate that the output of the equation summation circuit 42 finds dissimilarity with the first digit, i.e. the solution of a BLACK word digit. A typical example of an EXCLUSIVE OR circuit arrangement is shown in the Millman and Taub publication previously referenced.

In order to achieve a high reliability in the system provision is made to eliminate double signals and omissions from the summation of the equations. An EXCLUSIVE OR arrangement of the MARK and SPACE registers 34 and 36, through the use of crossed inhibit windings, makes it impossible to store a signal simultaneously in both of the corresponding MARK and SPACE cores of any digit. An omission of both a MARK and a SPACE signal for any digit will result in a failure of input signals to windings 62 or 64 and no output from the particular equation circuit 60 concerned. Thus, the summation of the remaining equations is performed without taking the omitted data into consideration.

Moreover, the mod-two addition of the equations is "verified" in that both MARK and SPACE data enters into the solution instead of merely adding the MARK or the SPACE signals of the two input digits.

The condition assumed by the WHITE-BLACK flip-flop 54 represents the determination of whether the word under process belongs to the WHITE or the BLACK category and gates the eighth equation circuit 52 and the digit solution circuit 56 so that the polarity of the signals processed therethrough will be given the proper interpretation.

During the digit solution, after the WHITE-BLACK determination has been made, the output of the summation circuit 42 is disconnected from the MARK bus 106 and SPACE bus 108 and connected to MARK and SPACE lines 110 and 112, respectively. If the flip-flop 54 has initiated the gating of a WHITE word, the line 110 conducts MARK signals to the digit solution 56. Positive signals along this line are then interpreted as MARKS and the absence of signals as SPACES. Similarly, if the condition of the flip-flop 54 is reversed to indicate a BLACK word, the signals gated to the digit solution 56 from line 112 indicate SPACES and the absences of signals indicate MARKS.

It has been explained previously that during the digit solution cycle the registers 34 and 36 are shifted five times to process the first five digits through the summation circuit 42. During this cycle the original five digits of the standard Baudot teletype code, which provided the input to the encoder, are decoded. The seven equations are solved for each one of the five digits, and, in addition, an eighth equation comprising a conversion of the contents of the first stage to the same type of positive going signal to represent a MARK and a negative going signal to represent a SPACE which the seven individual equations provide to the summation circuit 42 is connected to the input terminal 98 of the summation network.

Thus, for each of the five digits a total of eight equations involving every one of the total fifteen digits in the received word is performed to establish its identity. If the digit itself has been lost during transmission, it is supplied by the summation of equations involving the remaining digits of the word, and, if a digit has been received erroneously, the solution of equations involving correctly received digits will compensate in the summation circuit 42 for the error and provide a corrected digit via the digit solution circuit 56 to the read-out buffer 58.

When the communication link is established by a radio circuit having separate MARK and SPACE channels, additional information is available. If fading results in no signal in either the MARK or the SPACE channel or interference results in simultaneous signals in both channels, an omission signal may be transmitted to the decoder 24 to eliminate the associated equation from the summation process. For two omissions, five independent equations remain to be solved rather than seven. For three omissions, four equations remain, etc. Since two omissions leave five useful equations, and since five useful equations will always give a correct solution even in the presence of two errors, this system can correct for the combination of two errors and two omissions as well as correcting for three errors without omissions and supplying six (in some cases, seven) missing digits in error-free text of fifteen digit words.

Timing:

The timing and sync control circuit 40 which may consist of a conventional combination of a crystal controlled oscillator and appropriate count down and divider circuits to provide a system clock may, in one operative embodiment of the invention, produce the timing pulses diagrammed in FIG. 7.

To be compatible with existing teletypewriter transmission equipment a bit rate of 30 cycles per second is assumed. Since the system under discussion has a redundancy rate of 2 to 1 because of the extra error correcting digits, the character rate (fifteen bits per character) is 2 cycles per second. The shift rate of the registers 36 and 38 is 15,360 kc. and various timing pulses are supplied at 2, 30, 60, 480 and 960 cycles.

The sequence of operations may be grouped into the following four subsequences:

(1) Hold-off
(2) BLACK-WHITE Solution
(3) Five Bit Character Solution
(4) Load and Read-out.

The operation of the detector 22 may be assumed to be such that it integrates the received signal for each bit length (30 cycle period). At the end of this period the total accumulated energy is measured across a relatively low impedance load and the signal spike thus generated is used to fire a monostable. The output of this monostable is then the read-in source for the MARK and SPACE registers, and each bit of information enters its respective register 36 or 38 after the conclusion of its 30 cycle bit period, but before the immediately following 60 cycle period has elapsed.

(1) Hold-off

Each 2 cycle character pulse sets a control flip-flop in the timing and sync control circuit 40 which:

(*a*) gates off the read-out buffer 58,
(*b*) clears the counter 44, and
(*c*) sets the WHITE-BLACK flip-flop 54 to WHITE position.

(2) WHITE-BLACK Solution

The next 60 cycle pulse resets the control flip-flop which:

(*a*) starts (in sync) the 22 millisecond pulse generator in the read-out system and initiates a standard start-of-character pulse in the read-out buffer 58,
(*b*) gates on the 15,360 shift pulses for the shift registers 34 and 36,
(*c*) clears the buffer storage in the read-out 58,
(*d*) sets the read-out flip-flop in the buffer system 58, and
(*e*) energizes the input gates to the counter 44.

(3) Five Bit Character Solution

The next 960 cycle pulse actuates a gate which:
(*a*) closes the input gates to the counter 44,
(*b*) energizes the input gate to read-out buffer 58,
(*c*) inserts a control bit "one" into first stage of serial input six stage shift register of read-out buffer 58,
(*d*) energizes the driver for the shift register of read-out buffer 58, and
(*e*) energizes the eighth equation 52.

(4) Load and Read-out

Six 15,360 cycle pulses later, the control bit one inserted in the first stage of the six stage shift register of read-out buffer 58 is driven out of the sixth stage of the register which:

(*a*) de-energizes the input gate to the read-out buffer 58,
(*b*) cuts off the 15,360 cycle shift pulses to the MARK and SPACE registers 36 and 38, thereby returning them to the 30 cycle shift rate of loading operation, and
(*c*) release the output flip-flop in the buffer system 58.

The invention is not limited to the illustrative embodiment described, but is useful in other types of system, with other code word sequences and alternative encoding and decoding techniques, all within the scope of the appendant claims.

In the following claims the expression "sum-modulo-two addition" means binary add without carry. Its results may be expressed in the following truth table:

$$1\oplus1=0$$
$$1\oplus0=1$$
$$0\oplus1=1$$
$$0\oplus0=0$$

(Where the symbol $\oplus$ represents sum-modulo-two addition.)

A "mod-two adder" means a device, e.g. an electronic circuit, capable of performing sum-modulo-two addition of electronic signals or other representations of the "ones" and "zeroes" of binary mathematics.

What is claimed is:

1. For the transmission of digital data, an encoding-decoding system comprising: means for converting items of the data to be transmitted to first binary coded words constituted by individual electric impulses representing the individual digits of said words; means for converting said first words to second binary coded words including a multi-stage pulse shifting register, means for shifting said electric impulses corresponding to the component digits of said first word successively through successive stages of said register, and means for generating further digits by performing sum-modulo-two addition of certain ones of the digits of said first word at various shifted positions of said word; and, means for verifying the accuracy of selected digits of each transmitted word by comparing each of said selected digits with every other digit of the word concerned.

2. For the transmission of digital data, an encoding-decoding system comprising: means for converting items of the data to be transmitted to first binary coded words constituted by individual electric impulses representing the individual digits of said words; multistage shifting register means for converting said first words to second binary coded words including a mod-two adder and feedback connection from certain stages of said register through said adder and back to said register; and, means for verifying the accuracy of selected digits of each transmitted word by comparing each of said selected digits with every other digit of the word concerned.

3. A communication system comprising: means adapted to represent alpha-numeric characters in a series of binary coded electric impulses; an encoder for said pulses; said encoder including a multi-stage shifting register having feedback and control connections adapted to produce a sequence of electric impulses including said series of pulses followed by further pulses representing sum-modulo-two addition of selected pulses within said series; and, a decoder for said sequence of electric pulses, said decoder including means for verifying individual pulses within said sequence by comparison with every other pulse of said sequence.

4. A teletypewriter communication system comprising: a teletypewriter adapted to represent alpha-numeric characters in a series of binary coded electric impulses; an encoder for said pulses; said encoder including a multi-stage shifting register having feedback and control connections adapted to produce a sequence of electric impulses including said series of pulses followed by further pulses representing sum-modulo-two addition of selected pulses within said series; a decoder for said sequence of electric pulses; said decoder including means for verifying individual pulses within said sequence by comparison with every other pulse of said sequence and means for converting groups of said verified pulses to teletypewriter printing impulses.

5. A teletypewriter communication system comprising: a teletypewriter adapted to represent alpha-numeric characters in five bit binary coded electric impulse words; an encoder for said pulses; said encoder including a shifting register having at least five stages; a mod-two adder; feedback connection from the first, third and fifth stages of said register through said adder and back to the fifth stage of the register to produce a sequence of electric impulses including said series of pulses followed by further pulses representing sum-modulo-two addition of selected pulses within said series; a decoder for said sequence of electric pulses; said decoder including means for verifying individual pulses within said sequence by comparison with every other pulse of said sequence; and means for converting groups of said verified pulses to teletypewriter printing impulses.

6. In a communication system wherein intelligence is processed in the form of first binary coded digit words divided into at least two categories one of which represents different data by different combinations of binary digits which may be classified as WHITE words and the other of which represents other data by combinations consisting of the complement of the component digits of corresponding WHITE words and which may be classified as BLACK words, an encoding-decoding system which comprises: means for converting WHITE and BLACK first words to respective WHITE and BLACK second words by performing sum-mod-two addition of selected digits of the word concerned; means for determining whether individual ones of said second words belong to the WHITE or BLACK classification; and, means controlled by said determination for re-converting said second words to first words.

7. In a communication system wherein intelligence is processed in the form of first binary coded digit words divided into at least two categories one of which represents different data by different combinations of binary digits which may be classified as WHITE words and the other of which represents other data by combinations consisting of the complement of the component digits of corresponding WHITE words and which may be classified as BLACK words: an encoder which includes a multistage shift register and a first mod-two adder for converting WHITE and BLACK first words to respective WHITE and BLACK second words by performing sum-mod-two addition of selected digits of the word concerned; a decoder including a plurality of second mod-two adders and a signal comparison circuit for determining whether individual ones of said second words belong to the WHITE or BLACK classification; and, means controlled by said determination for re-converting said second words to first words.

8. In a communication system wherein intelligence is processed in the form of first binary coded digit words divided into at least two categories one of which represents different data by different combinations of binary digits which may be classified as WHITE words and the other of which represents other data by combinations consisting of the complement of the component digits of corresponding WHITE words and which may be classified as BLACK words: an encoder which includes a multistage shifting register and a first mod-two adder for converting WHITE and BLACK first words to respective WHITE and BLACK second words by performing sum-mod-two addition of selected digits of the word concerned; a decoder including a plurality of second mod-two adders and a signal comparison circuit for determining whether individual ones of said second words belong to the WHITE or BLACK classification; and, means controlled by said determination for re-converting said second words to first words, said controlled means including means for verifying the digits of said re-converted words by comparing them in said second mod-two adders with each of the other digits in their respective second word.

9. In a teletypewriter communication system wherein alpha-numeric characters are represented by five bit binary coded words divided into at least two categories one of which consists of a group of different combinations of binary digits which may be classified as WHITE words and the other of which consists of grouped complements of the component digits of corresponding WHITE words and may be classified as BLACK words: an encoder which includes a shifting register having at least five stages, a first mod-two adder, and feedback connections from the first, third and fifth stages of said register through said adder to the fifth stage for adding digits to said first words thereby making them second WHITE words and second BLACK words respectively; a decoder including a plurality of second mod-two adders arranged to determine whether individual ones of said second words belong to the WHITE or BLACK classification; and, means controlled by said determination for re-converting said second words to first words, said controlled means including means for verifying each digit of said re-converted words by comparison in said second mod-two adders with every other digit of their respective second word combinations.

10. For a teletypewriter system wherein alpha-numeric characters are individually represented by five bit combinations of binary coded electric impulses, an encoder comprising: an electric impulse shifting register having at least five stages; means for inserting said five bit combinations into the corresponding five stages of said register; means for deriving a sequence of digits from the first stage of said register; a mod-two adder; means for mod-two summing the contents of the first, third and fifth stages of said register in said adder; and, means connecting said mod-two summation to said fifth stage upon each shifting of said register.

11. For an electronic data processing system a parity digit generator comprising: a pulse shifting register; means for processing a series of electronic impulses representing data digits through said register in a series of pulse shifting operations; and, means for performing sum-modulo-two addition of the data content of given stages of said register after given ones of said shifting operations.

12. For an electronic data processing system a data word generator comprising: a multi-stage shifting register; means for inserting data digits into the various stages of said register; means for processing said data through successive stages of said register in a series of shifting operations; means for performing sum-modulo-two addition of the data content of given ones of the component stages of said register after given ones of said shifting operations to produce parity digits; and, means for combining said data digits and said parity digits to provide said data word.

13. For an electronic data processing system a data word generator comprising: a multi-stage pulse shifting register; means for inserting data digits into the various stages of said register; means for processing said data through successive stages of said register in a series of shifting operations; means for performing sum-modulo-two addition of the data content of given ones of the component stages of said register after given ones of said shifting operations to produce parity digits; means for performing sum-modulo-two addition involving said parity digits to produce additional parity digits; and, means for combining said data digits, said parity digits and said additional parity digits to provide said data word.

14. For producing a data word in an electronic data processing system apparatus comprising: a multi-stage pulse shifting register; means for inserting into the individual component stages of said register electronic impulses corresponding to binary coded digital data; a sum-modulo-two adder having input connections from selected stages of said register and an output connection back into one of the stages of said register; a data output connection from said register; means for processing said inserted data from stage to stage through said register in a series of pulse shifting operations; means for performing in said adder sum-modulo-two addition of the contents of those stages of said register which are connected to its input after given ones of said shifting operations to produce parity digits; means for inserting the results of said addition back into said register via said output connection from said adder; means for shifting said parity digits through said register in similar shifting operations; means for performing sum-modulo-two addition of said parity digits in said adder after given ones of said similar shifting operations; means for inserting said additional digits into said register via said output connection from said adder; means for shifting said additional parity digits through said register; and, means for deriving from said data output connection of said register a data word which is comprised of said first inserted data digits, said parity digits and said additional parity digits.

15. For a digital communication system encoding apparatus comprising: means for providing message data in $n$ bit binary coded sequences; and, means for expanding each of said $n$ bit sequences into a $2^{n-1}$ bit sequence by a series of sum-modulo-two additions of data commencing with the component digits of said $n$ bit sequence.

References Cited in the file of this patent

UNITED STATES PATENTS

| | | |
|---|---|---|
| 2,706,215 | Van Duuren | Apr. 12, 1955 |
| 2,862,054 | Curtis | Nov. 25, 1958 |
| 2,956,124 | Hagelbarger | Oct. 11, 1960 |